(12) United States Patent
Callis et al.

(10) Patent No.: US 6,820,121 B1
(45) Date of Patent: Nov. 16, 2004

(54) METHODS SYSTEMS AND COMPUTER PROGRAM PRODUCTS FOR PROCESSING AN EVENT BASED ON POLICY RULES USING HASHING

(75) Inventors: Gregory M. Callis, Morrisville, NC (US); Jon Kevin Franks, Holly Springs, NC (US); Lap Thiet Huynh, Apex, NC (US); Loan Nguyen, Durham, NC (US); Diane Iupe Shannon, Raleigh, NC (US); David Yu Pin Yang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 09/645,651

(22) Filed: Aug. 24, 2000

(51) Int. Cl.$^7$ .............................................. G06F 15/173
(52) U.S. Cl. ........................ 709/225; 709/250; 711/216
(58) Field of Search ................................. 709/225, 238, 709/228, 218, 250; 711/216, 221

(56) References Cited

U.S. PATENT DOCUMENTS

| | | | | |
|---|---|---|---|---|
| 6,442,553 B1 | * | 8/2002 | Take ........................... | 707/100 |
| 6,493,813 B1 | * | 12/2002 | Brandin et al. .............. | 711/216 |
| 6,542,488 B2 | * | 4/2003 | Walton et al. ............... | 370/335 |
| 6,556,982 B1 | * | 4/2003 | McGaffey et al. ............ | 706/50 |
| 6,625,689 B2 | * | 9/2003 | Narad et al. ................. | 711/110 |
| 6,700,809 B1 | * | 3/2004 | Ng et al. ....................... | 365/49 |
| 6,718,379 B1 | * | 4/2004 | Krishna et al. .............. | 709/223 |

OTHER PUBLICATIONS

Internet draft entitled "Policy Core LDAP Schema," draft–IETF–policy–core–schema–07.txt, Jul. 14, 2000 ("IETF proposal").

*Hash Tables, Introduction to Algorithms*, by T.H. Cormen, C.E. Leiserson and R.L. Rivest; Chapter 12, MIT Press, 1990.

*URL Forwarding and Compression in Adaptive Web Caching, Proceeeding IEEE INFOCOM 2000;* by B.S. Michel, et al., vol. 2, p. 670–678.

Mac Devine. Presentation entitled, *TCP/IP Application Availability and Workload Balancing in the Parallel Sysplex.* Share Technical Conference (Aug. 22–27, 1999).

\* cited by examiner

*Primary Examiner*—Zarni Maung
(74) *Attorney, Agent, or Firm*—Myers Bigel Sibley & Sajovec, P.A.; Jerry W. Herndon

(57) ABSTRACT

Embodiments of the present invention include methods, systems and computer program products which provide for processing an event having a classification based on associated policy rules where the policy rules are conditioned on the classification. A policy rules hash table is provided including a plurality of policy rule entries, each policy rule entry being associated with a hash index. A hash index is generated using a classification hash length based on the classification of the event, the classification having an associated length at least equal to the classification hash length. A policy rule entry in the policy rules hash table is identified that corresponds to the generated hash index. It is determined if a classification field length associated with the identified policy rule corresponds to the classification hash length. The identified policy rule entry is executed if the hash length associated with the identified policy rule corresponds to the classification hash length.

36 Claims, 7 Drawing Sheets

METHODS SYSTEMS AND COMPUTER PROGRAM PRODUCTS FOR PROCESSING AN EVENT BASED ON POLICY RULES USING HASHING

FIELD OF THE INVENTION

The present invention relates to policy rule based operations and more particularly to policy rule based computer network systems such as computer networks.

BACKGROUND OF THE INVENTION

Computer networks have grown increasingly complex with the use of distributed client/server applications, mixed platforms and multiple protocols all in a single physical backbone. The control of traffic on networks is likewise moving from centralized information systems departments to distributed work groups. The growing utilization of computer networks is not only causing a move to new, high speed technologies, but is at the same time making the operation of computer networks more critical to day to day business operations. The use of quality of service (QoS) criteria for managing and/or contracting communication service level agreements (SLAs) is becoming increasingly common in networks, such as networks supporting Internet protocol (IP) communications.

The Internet Engineering Task Force (IETF) has proposed a set of policy schemas (object oriented models of policy classes and policy attributes) and a policy framework for managing future networks. The IETF proposed policy based networking technology is described in the Internet draft entitled "Policy Core LDAP Schema," draft-IETF-policy-core-schema-07.txt, Jul. 14, 2000 ("IETF proposal"). Among other things, the IETF proposal includes three policy classes referred to as policy Rule, policy Action and policy Condition respectively. A policy rule (class policyRule) has the following semantics: "If Condition then Action." In other words, the actions (class policyAction) specified by a policy rule are to be performed/executed only if the policy condition (class policyCondition) evaluates to TRUE (i.e., is met).

Stated differently, the IETF proposal provides policy conditions which represent a set of criteria that are used to identify various groupings, such as host(s), routing, application(s), based on which, if the condition evaluates to TRUE, appropriate actions are performed. The application condition group, for example, includes, among other things, an attribute that is used to identify the content of the application data to be used in the policy condition evaluation. This data, for Web requests, generally represents the Universal Resource Indicator (URI) portion of the Universal Resource Locator (URL) or the directory where the object of the request is located.

In addition to the network environment, various other areas are dependent upon operations which are policy rule based. Thus, structuring procedures or methods based upon a policy expressed as "If Condition then Action" may be generalized across a broad scope of applications where similar issues of implementation may be encountered. Some of these application environments operate under conditions without time pressures. However, implementation of such policy rule based operations in time sensitive environments, such as a high speed network environment, can place time critical demands on processing capabilities of various network communication server devices. Rapid detection of the application data type or other aspects of a communication packet processed by a communication server may be critical, for example, where service differentiation by different data types is utilized to guarantee SLAs related to QoS.

As an example, in the environment of the worldwide Web (Web or Internet), each hypertext transport protocol (HTTP) type request can result in a different data type(s) being sent to a requesting client device from a server device. For example, an HTTP request may call for video/audio data streaming, transaction oriented data, FTP data, etc. Different data types may require different service levels to be assigned while the data is being transmitted to the client. For instance, File Transfer Protocol (FTP) type data generally requires low loss but is not highly sensitive to delays whereas video/audio data will typically be sensitive to delay but not to loss.

SUMMARY OF THE INVENTION

Embodiments of the present invention include methods, systems and computer program products which provide for processing an event having a classification based on associated policy rules where the policy rules are conditioned on the classification. A policy rules hash table is provided including a plurality of policy rule entries, each policy rule entry being associated with a hash index. An event is received and a hash index is generated using a classification hash length based on the classification of the event, the classification having an associated length at least equal to the classification hash length. A policy rule entry in the policy rules hash table is identified that corresponds to the generated hash index. It is determined if a classification field length associated with the identified policy rule corresponds to the classification hash length. The identified policy rule entry is executed if the hash length associated with the identified policy rule corresponds to the classification hash length.

In further embodiments of the present invention, the hash index is generated using a list identifying classification hash lengths to be used for generation of a hash index for a plurality of candidate classification lengths of the classification. The list has associated classification hash lengths corresponding to classification field lengths associated with at least one of the plurality of policy rule entries. A classification hash length is identified from the provided list for the received event which is no greater than the associated length of the classification. The hash index is generated using the identified classification hash length.

Identification of a classification hash length in various embodiments includes identifying from the provided list a classification hash length for the received event which is equal to the associated length of the classification of the received event if such a classification hash length is found in the provided list. A classification hash length which is found in the provided list is selected as a classification hash length for the received event, the selected classification hash length being a largest length not greater than the associated length of the classification of the received event, if a classification hash length which is equal to the associated length of the classification of the received event is not found in the provided list.

In other embodiments of the present invention, the identified policy rule entry has a plurality of associated conditions, the classification being one of the plurality of associated conditions. It is determined if all of the plurality of associated conditions are met and the identified policy rule entry is executed only if all of the plurality of associated conditions are met.

In yet other embodiments of the present invention, a method is provided for processing an event having a classification based on associated policy rules, the policy rules being conditioned on the classification. A policy rules hash table is provided including a plurality of policy rule entries, each policy rule entry being associated with a hash index. A list is also provided identifying classification hash lengths to be used for generation of a hash index for a plurality of candidate classification lengths of the classification, the list having associated classification hash lengths corresponding to classification field lengths found in at least one of the plurality of policy rule entries. An event is received. A classification hash length is identified from the provided list for the received event which is no greater than an associated length of the classification of the received event. A hash index is generated using the identified classification hash length. A policy rule entry is identified in the policy rules hash table that corresponds to the generated hash index and that has an associated classification field length that corresponds to the classification hash length of the event. It is determined if all conditions associated with the identified policy rule entry are met and the identified policy rule entry is executed if all conditions associated with the identified policy rule entry are met.

In other embodiments of the present invention, it is further determined if another policy rule entry in the policy rules hash table corresponds to the generated hash index and that has an associated classification field length that corresponds to the classification hash length of the event if a first policy rule entry in the policy rules hash table is identified that corresponds to the generated hash index and that has an associated classification field length that does not correspond to the classification hash length of the event. It is also determined if all conditions associated with the another policy rule entry are met and the another policy rule entry is executed if all conditions associated with the another policy rule entry are met.

It may also be determined if the identified policy rule entry includes a reference to an alternate policy rule entry in the policy rules hash table if all conditions associated with the identified policy rule entry are not met. Then it is determined if all conditions associated with the alternate policy rule entry are met and the alternate policy rule entry is executed if all conditions associated with the alternate policy rule entry are met. A next lowest classification hash length which is found in the provided list may be selected as an alternate classification hash length for the received event, the selected next lowest classification hash length being a largest length not greater than the selected classification hash length, if all conditions associated with the identified policy rule entry are not met and if the identified policy rule entry does not include a reference to an alternate policy rule entry. The hash index may then be generated using the next lowest classification entry.

In further embodiments of the present invention, a method is provided for processing a Web request having an associated classification at a communication server based on associated policy rules, the policy rules being conditioned on the classification. A policy rules hash table including a plurality of policy rule entries, each policy rule entry being associated with a hash index is provided. A list is also provided identifying classification hash lengths to be used for generation of a hash index for a plurality of candidate classification lengths of the classification, the list having associated classification hash lengths corresponding to classification field lengths found in at least one of the plurality of policy rule entries. The Web request is received at the communication server. A classification hash length is identified from the provided list for the received Web request which is no greater than an associated length of the classification of the received Web request. A hash index is generated using the identified classification hash length. A policy rule entry is identified in the policy rules hash table that corresponds to the generated hash index and that has an associated classification field length that corresponds to the classification hash length of the Web request. It is determined if all conditions associated with the identified policy rule entry are met and the identified policy rule entry is executed to process the Web request if all conditions associated with the identified policy rule entry are met. The associated classification may be a Universal Resource Indicator (URI) associated with the Web request.

In other embodiments of the present invention, systems are provided for processing an event having a classification based on associated policy rules, the policy rules being conditioned on the classification. The systems include a policy rules hash table including a plurality of policy rule entries, each policy rule entry being associated with a hash index. A hash index generator circuit generates a hash index using a classification hash length based on the classification of the event, the classification having an associated length at least equal to the classification hash length. A hash lookup circuit identifies a policy rule entry in the policy rules hash table that corresponds to the generated hash index. A comparison circuit determines if a classification field length associated with the identified policy rule corresponds to the classification hash length and executes the identified policy rule entry if the hash length associated with the identified policy rule corresponds to the classification hash length. The systems may be provided on a communication server of a computer network and the event may be a Web request received at the communication server.

While the invention has been described above primarily with respect to the method aspects of the invention, both systems and/or computer program products are also provided.

DETAILED DESCRIPTION OF PREFERRED EMBODIMENTS

Figure 1:
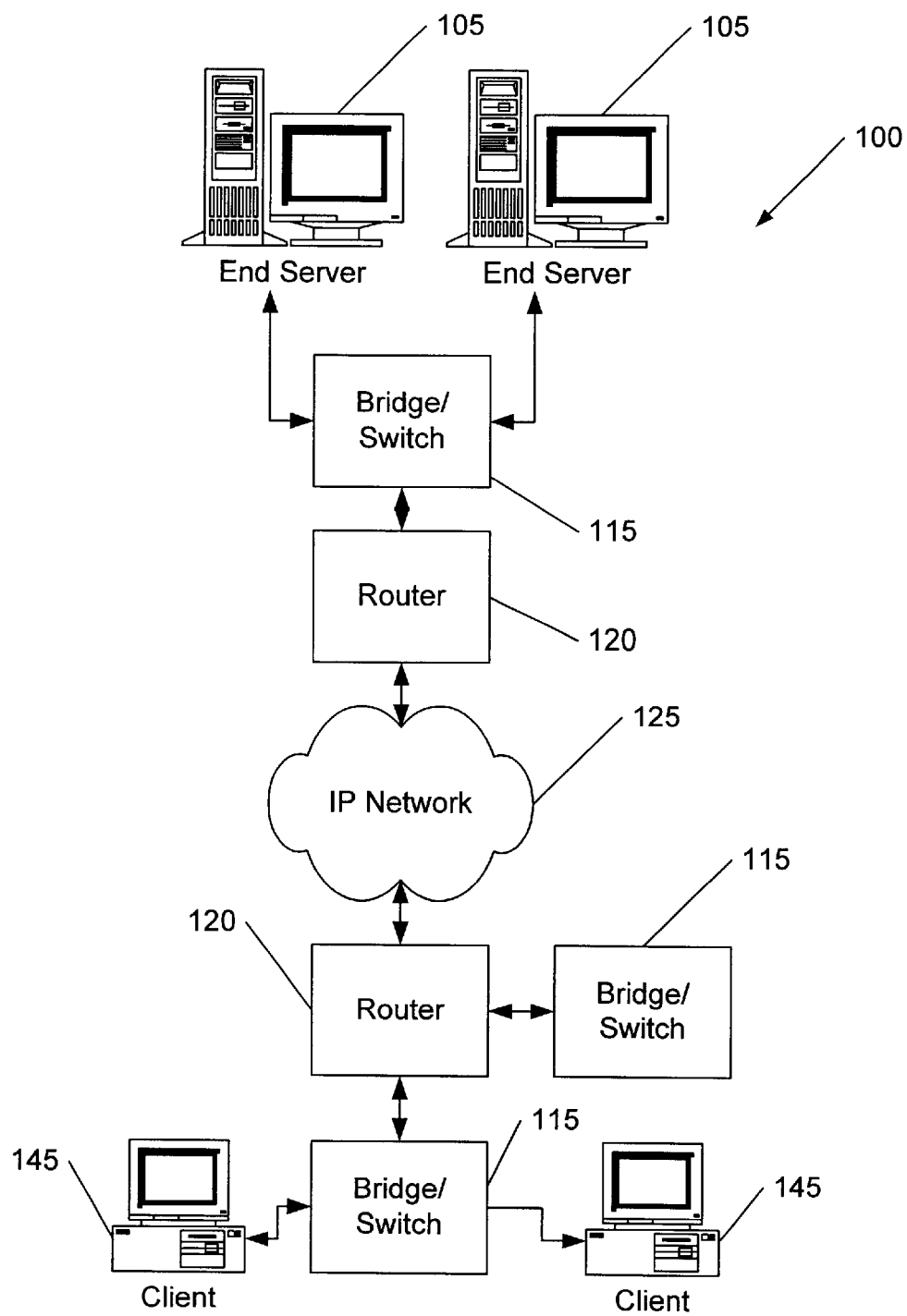
FIG. 1 is a block diagram of a network environment in which the present invention may be implemented.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Referring first to the block diagram illustration of FIG. 1, a network environment in which the present invention may be implemented will be generally described. As illustrated in FIG. 1, the communication network 100 includes a plurality of connecting nodes and endpoint nodes. As shown in FIG. 1, two endpoint servers 105 and two clients 145 are shown which are endpoints on the communication network 100. However, additional devices may be connected and that a single computer device may serve as both a server and a client in different transactions and may further function as a connecting node between network 100 and another network.

As shown in FIG. 1, endpoint servers 105 connect through a bridge switch 115 and a router 120 to the IP network 125. Clients 145 are also connected to the IP network 125 through a bridge/switch 115 and a router 120. Additional bridge/switches 115 and routers 120 may be included in the IP network 125 as will be understood by one of ordinary skill in the art.

The communication network 100 may be provided by wired or wireless links using a variety of physical layer media and still stay within the teachings and scope of the present invention. Furthermore, while the present invention is described primarily in the context of communication networks and control of communication traffic on such networks, the present invention is not so limited and may be utilized beneficially in processing events based on policy rules, particularly in environments where processing speed for automatically identifying and executing an appropriate policy rule action is important. For example, fast methodologies for classifying Web based communication requests (such as those designated by an HTTP address) for assignment of appropriate QoS based on policy rules is desirable for use with communication servers handling communications over networks such as the communication network 100. The routers 120 may operate as communication servers to provide appropriate service levels to packets routed through the respective routers 120 based on policy rule.

In addition to use with link type devices such as router 120 or bridge/switches 115, rule based processing of communication requests may also be beneficially implemented in endpoint devices such as servers 105 or clients 145. Such capabilities may be particularly beneficial in light of emerging network trends where service differentiation of different data types is important in guaranteeing service level agreement (SLA) performance. Various embodiments of the present invention, as will be described herein, may provide communication servers which classify a Web request based on a policy definition, which classification may be used to assign an appropriate QoS level for a request once a matching policy rule is found. This approach may reduce the overall number of policy rules that need to be evaluated for each event and processing of rules efficiently and in real time may be implemented for processing Web requests.

The methodology of the present invention may generally be referred to in various embodiments as longest content based classification (LCBC). Such methodologies may be used, for example, to support policy based networking, such as that proposed by the IETF proposal for managing future networks.

Figure 2:
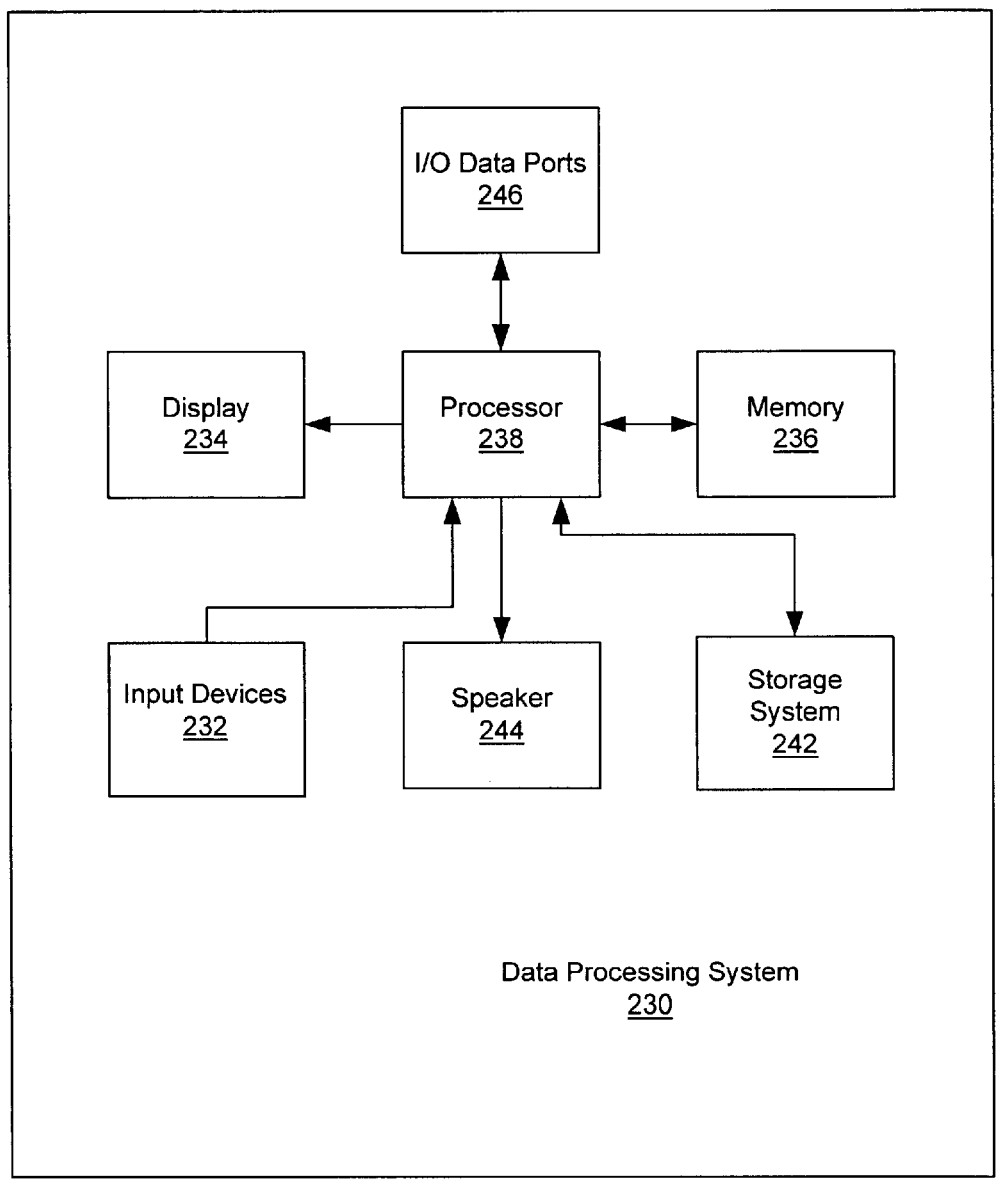
FIG. 2 is a block diagram of data processing systems according to embodiments of the present invention.

The present invention will now be further described with reference to the block diagram of FIG. 2 which illustrates data processing systems according to embodiments of the present invention. As illustrated in FIG. 2, the system 230 may include input device(s) 232 such as a keyboard or keypad, a display 234, and a memory 236 that communicate with a processor 238. The data processing system 230 may further include a storage system 242, a speaker 244 and an I/O data port(s) 246 that also communicate with the processor 238. The storage system 242 may include removable and/or fixed media such as floppy disks, ZIP drives, hard disks or the like as well as virtual storage such as a RAMDISK. The I/O data port(s) 246 can be used to transfer information between the data processing system 230 and another computer system or a network (e.g., the Internet). Such data processing systems may include, for example, personal computers, laptop computers, mainframe computers, pervasive computing devices such as personal digital assistants, smartphones or the like, or even embedded processing systems. The components of a particular data processing system may be conventional or custom components, such as those used in many conventional computing devices, which may be configured to operate as described herein.

Figure 3:
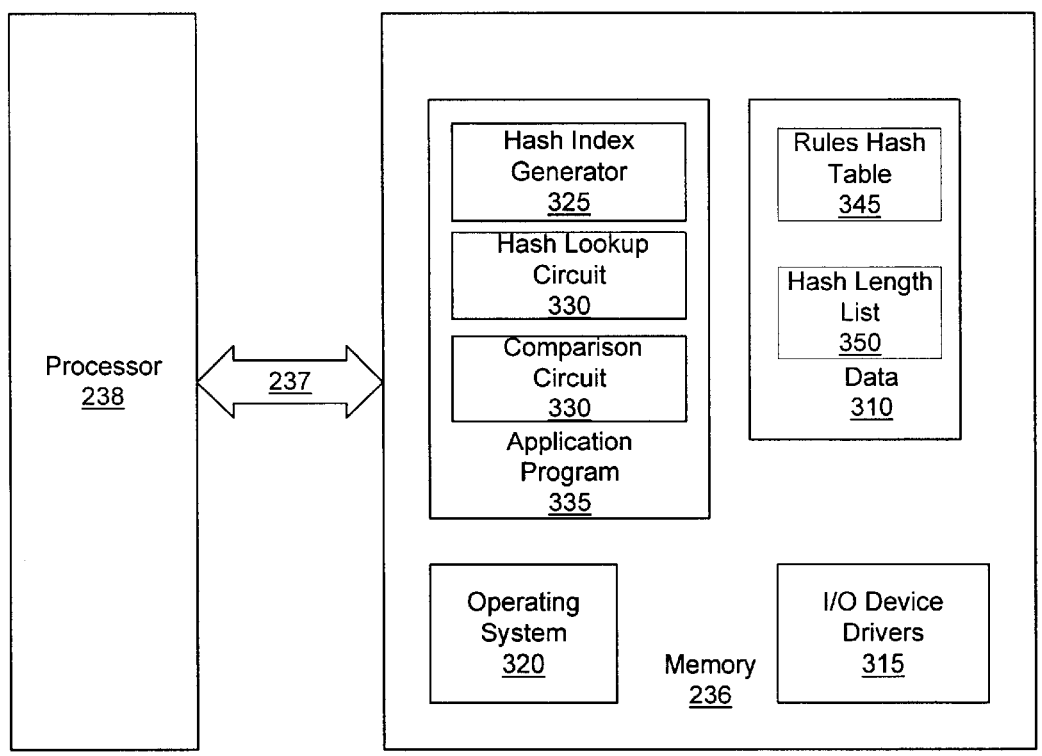
FIG. 3 is a more detailed block diagram of data processing systems according to embodiments of the present invention.

FIG. 3 is a block diagram of a data processing system that illustrates systems, methods, and computer program products in accordance with embodiments of the present invention. The processor 238 communicates with the memory 236 via an address/data bus 237. The processor 238 can be a commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may contain several categories of software and data used in the data processing system 230: the operating system 320; the application program 340; the input/output (I/O) device drivers 315; and the data 310. As will be appreciated by those of skill in the art, the operating system 320 may be any operating system suitable for use with a data processing system, such as OS/2, AIX or OS/390 from International Business Machines Corporation, Armonk, N.Y., WindowsCE, WindowsNT, Windows95, Windows98 or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

The I/O device drivers 315 typically include software routines accessed through the operating system 320 by the application program 340 to communicate with devices such as the input devices 232, the display 234, the speaker 244, the storage system 242, the I/O data port(s) 246, and certain memory 236 components. The application program 340 is illustrative of the programs that implement the various features of the data processing system 230. Finally, the data 310 represents the static and dynamic data used by the application program 340, operating system 320, I/O device drivers 315, and other software programs that may reside in the memory 236.

As is further seen in FIG. 3, the application program 340 preferably includes a hash index generator circuit 325, a hash look up circuit 330 and a comparison circuit 335. The data 310 in various embodiments as shown in FIG. 3 includes a policy rules hash table 345 and a list identifying classification hash lengths 350. The policy rules hash table 345 includes a plurality of policy rule entries. Each policy rule entry in the policy rules hash table 345 is associated with a hash index. The list identifying classification hash lengths 350 provides identification of classification hash lengths to be used for generation of a hash index for a plurality of candidate classification lengths of the classification. The list 350 may have associated classification hash lengths corresponding to classification field lengths found in at least one of a plurality of policy rule entries of the policy rules hash table 345.

An exemplary hash table 345 and list 350 will now be further described in the context of an application data type classification implementation of the present invention. More particularly, the following description will assume the classification is based on the URI of an event, such as a packet received at a communication server using an Internet protocol Web communications environment. The designation will generally be described as "application-data" for purposes of this description. In this context, the policy rules hash table 345 with Web content application-data in the policy conditions is kept in the table 345. In other words, a hash index may be generated on the application-data (such as a URI or portion thereof), which hash index is used to find a hash table entry that contains the corresponding policy rule entry in which the application-data is defined.

In various embodiments, to handle a case where two or more application-data specifications result in the same hash index, each hash table entry may contain a collision chain that keeps track of candidate policy rule entries having a common hash index. As will be further described herein, upon classifying a Web request which specifies a URI as an application-data that is hashed into a hash table entry (via a hash index), only those policy rules with application-data with the same hash index may need to be processed.

Referring again to FIG. 3, the hash index generator circuit 325 is configured to generate a hash index using a classification hash length based on the classification of the event. More particularly, the classification event preferably has an associated length at least equal to the classification hash length. In other words, with the URI based example as described above, the number of characters utilized to generate the hash index (i.e., the classification hash length) is no greater than the number of characters contained in the received event URI.

The hash look up circuit 330 identifies a policy Rule entry in the policy rules hash table 345 that corresponds to the generated hash index from the hash index generator circuit 325. The comparison circuit 335 determines if a classification field length associated with the identified policy rule corresponds to the classification hash length (i.e., the length used in generating the hash index) and executes the identified policy rule entry if the hash length associated with the identified policy rule corresponds to the classification hash length.

While the present invention is illustrated, for example, with reference to an application program 10 which carries out the operations, as will be appreciated by those of skill in the art, these functions may also be incorporated into, for example, the operating system 252. Thus, the present invention should not be construed as limited to the configuration of FIG. 3 but is intended to encompass any configuration capable of carrying out the operations described herein.

Operations according to various embodiments of the present invention for processing an event having a classification based on associated policy Rules, the policy Rules being conditioned on the classification, will now be described further with reference to the flowchart illustrations of FIGS. 4–6.

Figure 4:
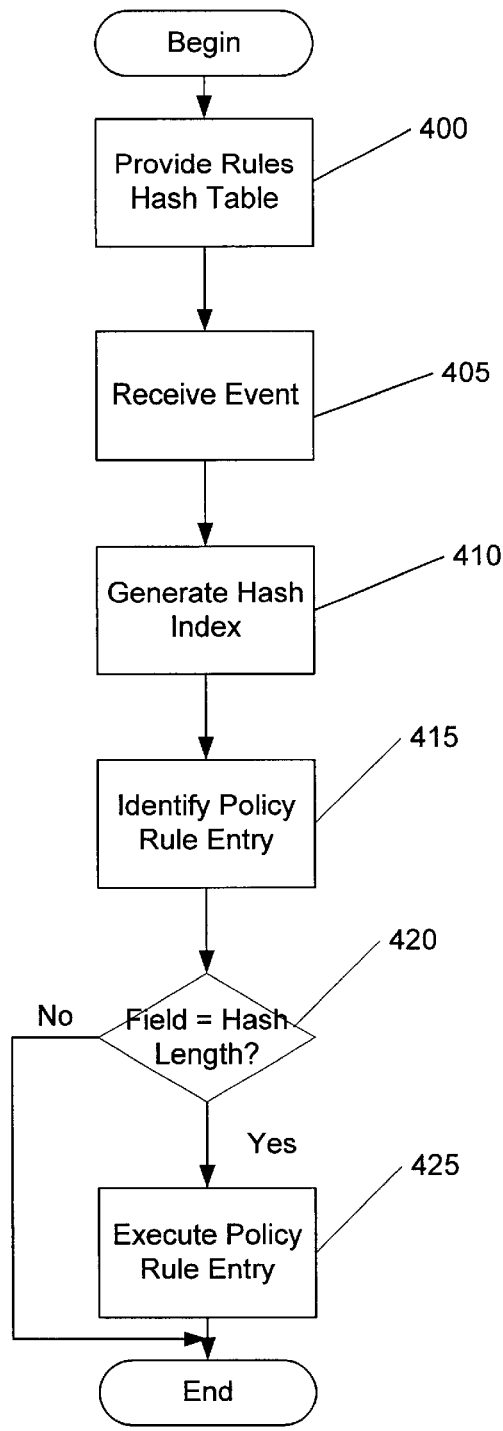
FIG. 4 is a flowchart illustrating operations according to embodiments of the present invention.
Figure 5:
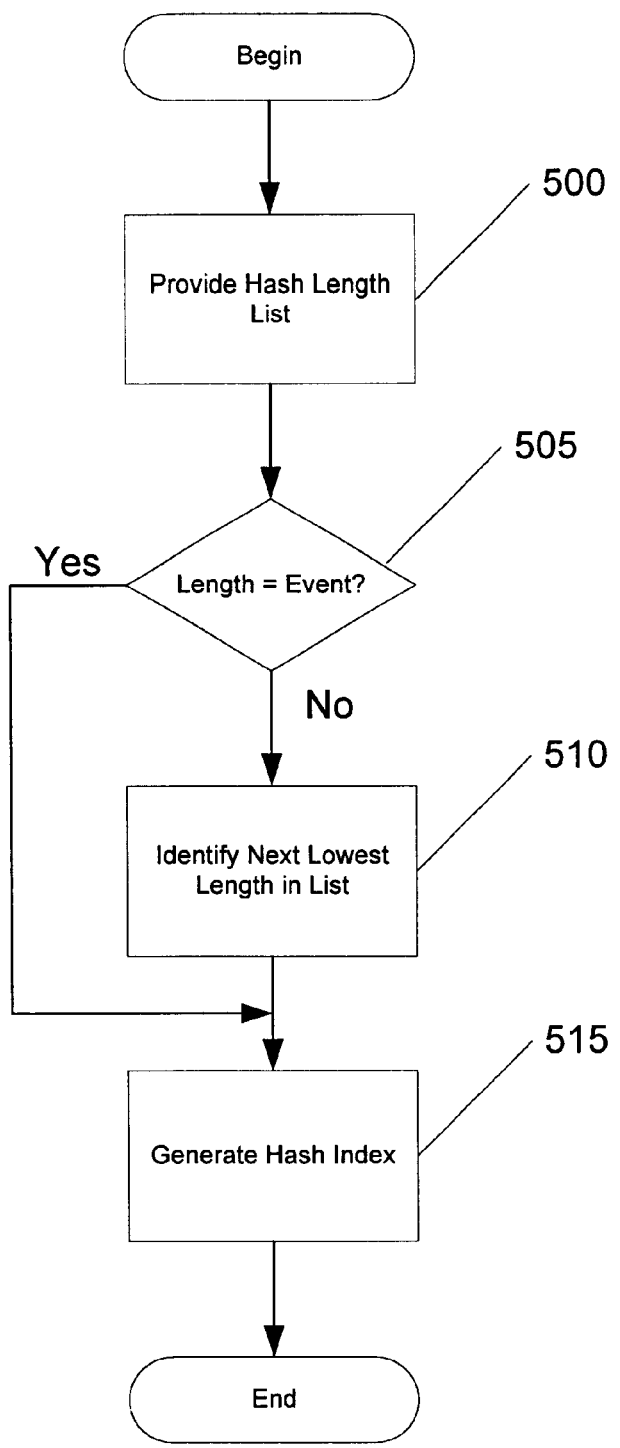
FIG. 5 is a flowchart illustrating operations according to embodiments the present invention.

Operations begin with reference to FIG. 4 at block 400 by providing a policy rules hash table 345 including a plurality of policy rule entries with each policy rule entry being associated with a hash index. An event, such as a Web request, is received (block 405). A hash index is generated using a classification hash length based on the classification of the received event (block 410). As discussed previously, the classification has an associated length at least equal to the classification hash length. The particulars of implementation of hashing functions and generation of hash indices are generally known to those of skill in the art and will not be further described herein except with reference to the selection of the hash length used in generating a hash index in accordance with embodiments of the present invention. References describing hashing functions known to those of skill in the art include the text "Introduction to Algorithms," Korman, T. H., Leiserson, C. E., Rivest, R. L., Chapter 12, MIT Press (1990). An exemplary longest string/prefix matching algorithm is described in the paper entitled "URL Forwarding and Compression in Adaptive Web Caching," by B. S. Michel, et al., Proceedings IEEE Infocom 2000, pp. 670–678, Vol. 2.

A policy rule entry in the policy Rules hash table 345 is identified that corresponds to the generated hash index (block 415). At block 420, it is determined if a classification field length associated with the identified policy rule corresponds to the classification hash length used in generating the hash index at block 410. If the lengths correspond, the identified policy rule entry is executed (block 425).

Operations related to generating a hash index at block 410 will now be further described with reference to the embodiments illustrated in FIG. 5. Operations begin at block 500 with providing of a list 350 identifying classification hash lengths to be used for generation of a hash index for a plurality of candidate classification lengths of the classification. For example, if a URI classification of a Web request may include up to, for example, 128 characters, the plurality of candidate classification lengths of the classification would range from 1 through 128, thus providing 128 candidate classification lengths of the classification.

The list 350 may have associated classification hash lengths corresponding to classification field lengths associated with at least one of the plurality of policy rule entries contained in the policy rules hash table 345. For example, if all of the policy rule entries in the policy rules hash table 345 have a classification field length of 4, 8 or 16, then there is no requirement for specification of a classification hash length in the list 350 other than 4, 8 and 16. Thus, for the 128 character example, all of the 128 characters would map to one of the three classification hash lengths (4, 8 and 16).

At block 505 it is determined if a classification hash length for the received event which is equal to the associated length of the classification of the received event has been found in the list 350. If so, the classification equaling the associated length of the classification of the received event is used in generating the hash index (block 515). If no classification hash length is found in the list 350 which is equal to the associated length of the classification of the received event (block 505), a classification hash length which is found in the provided list is selected as a classification hash length for the received event where the selected classification hash length is a largest length not greater than the associated length of the classification of the received event (block 510). The hash index is then generated using the selected next lowest length classification hash length which is found in the list 350 (block 515).

Further embodiments of the present invention will now be described with reference to FIG. 6. Operations begin at block 600 with provision of a policy rules hash table 345 including a plurality of policy rule entries. Each policy rule entry is associated with a hash index. As described previously, a list 350 identifying classification hash lengths to be used for generation of a hash index is also provided (block 600). A classification hash length for the received event is identified from the provided list 350, the hash length being no greater than an associated length of the classification of the received event as will be now described with reference to block 605 and 610 for particular embodiments of the present invention.

At block 605, it is determined if a classification hash length for the received event is included in the list 350 which is equal to the associated length of the classification of the received event. If so (block 605), the entire associated classification is used in generating the hash index (block 610). If not (block 605), a classification hash length which is found in the provided list 350 is selected as the classification hash length for the received event, the selected length being a largest length not greater than the associated length of the classification of the received event (block 610).

The length determined for hash generation at block 605 and block 610 is used to generate a hash index (block 615). A policy rule entry in the policy rules hash table 345 is identified that corresponds to the generated hash index (block 620). It is further determined whether the identified policy rule entry has an associated classification field length that corresponds to the classification hash length used in generating the hash index (block 625). If the length used in generating the hash index at block 615 and the associated classification field length of the policy rule entry identified at block 620 match, it is determined if other conditions associated with the identified policy rule entry are also met (block 640). In other words, for the illustrated embodiments of FIG. 6, it is assumed that the conditions required for selection of a policy rule as TRUE, thus initiating execution of an associated action, include multiple conditions, only one of which is the classification used in generating the hash index. If all the conditions for the identified policy rule are met (block 640), the identified policy rule entry is executed (i.e., an Action associated with the policy rule entry is executed) (block 655).

If the associated classification field length of the first identified policy rule entry does not match (block 625) another policy in the policy rule hash table which corresponds to the generated hash index from block 615 is identified (block 630). It is determined at block 635 if the associated classification field length of the policy rule identified at block 630 corresponds to the classification hash length of the event. If a match is detected at block 635, it is determined at block 640 if any other conditions associated with the policy rule entry identified at block 630 are met. If so, the policy rule entry identified at block 630 is executed (block 655).

If the classification hash length of the policy rule entry identified at block 620 matches (block 625), but the other conditions associated with such a policy rule entry are not met (block 640), it is determined if the policy rule entry identified at block 620 includes a reference to an alternate policy Rule entry in the policy Rules hash table 350 (block 645). This optional aspect of various embodiments of the present invention may be referred to as a "collision chain" to process cases where two or more application-data specifications (event classifications) result in a common hash index by providing each hash table entry a collision chain to track through alternate policy entries which share a common hash index. The collision chain may be provided by records contained in each policy rules entry or by a separate list or table providing an index for each link in each such collision chain.

If an alternate policy rule entry is identified at block 645, it is determined at block 650 if all conditions associated with the identified alternate policy rule entry are met. If so, the identified alternate policy entry from block 645 is executed (block 655). If not, additional alternate policy rule entries may be evaluated if such exist.

If an alternate policy rule entry is identified at block 645 but other conditions associated with the alternate policy rule entry (or entries if multiple alternate policy rule entries are in the hash table) are not met (block 650), operations return to block 610 and a next lowest classification hash length is selected from the list 350 as an alternate classification hash length for the received event. Thus, the selected next lowest classification hash length would also be a largest length not greater than the previously selected classification hash length. For example, if candidate classification hash lengths were 4, 8 or 16 characters and a received event's associated classification was 17 characters, a 16 character classification hash length would be initially selected, the 8 character classification class length would be selected on a second pass and, if necessary, the 4 character classification hash length could be selected for testing on a third pass. The operations described with reference to blocks 615–655 could then proceed as described previously utilizing the hash index generated with the alternate classification hash length in successive passes.

Figure 7:
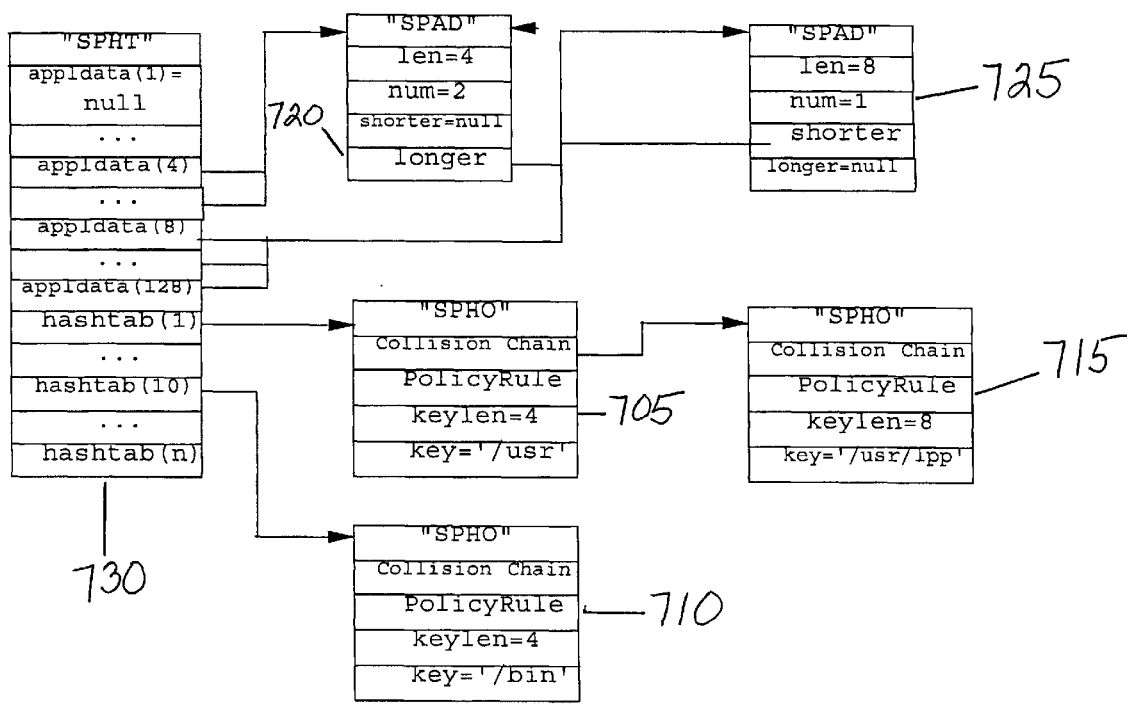
FIG. 7 is a block diagram illustrating an index and hash table structure according to embodiments of the present invention.

Operations according to various embodiments of the present invention will now be described by providing a number of examples where the received event is a Web request and the URI of the Web request is the associated classification. To facilitate presentation of these exemplary examples, reference is first made to FIG. 7 which illustrates a policy rules hash table 345 and hash length list 350 for use in explaining operations of the present invention by way of examples. Please note, however, for the sake of simplicity of explanation a relatively simplified hash table is shown in FIG. 7 including only three policy rule entries 705, 710, 715. Two classification lengths are provided in the classification hash length list 720, 725. The respective classification hash length entries 720, 725 and the policy rule entries 705, 710, 715 are linked through an index table 730. For the embodiment illustrated in FIG. 7, various records are contained in each entry 705–730, some of which relate to table management and others of which may be referred to in the context of the descriptions.

For the illustration of FIG. 7, it is assumed that the application-data can have a maximum length of 128 as shown by the "appldata(n)" entries in index table 730. The policy rules hash table 350, for the embodiments of FIG. 7, includes policy rule entries 705, 710, 715 corresponding to three different application-data entries, "/usr," "bin," and "/usr/lpp" respectively designated by the "key" field shown in FIG. 7. Note that these correspond to only two associated corresponding classification field lengths of four and eight characters identified by the "keylen" (associated classification length) field in the policy rule entries 705, 710, 715. As a result, there are only two classification hash length entries 720, 725 associated with candidate hash lengths of 4 and 8 respectively as noted in the "keylen" field of the has length entries 720, 725.

It is also assumed, as illustrated in FIG. 7 for the examples to be described below, that the policy rule entries 705 and 715 correspond to the same hash index in the hash table 730, more particularly, the hash index entry identified as "hashtab (1)" in the index table 730. Thus, the policy rule entry 705 includes a "collision chain" field entry which points to the policy rule entry 715. The "collision chain" field of policy rule entries 710 and 715, as shown in FIG. 7, would be a null set.

The indexing between candidate classification hash lengths and associated classification lengths of received events ranging from 1 through 128 is also shown in the index table 730. These entries more particularly point to the longest hash table entry length less than or equal to the character length of the candidate received URI (classification length associated with a received event). Thus, for the example shown in FIG. 7, the fields "appldata (1)" through "appldata(3)" are null because there are no hash table entries of length 3 or lower (in other words, no application-data of an associated length two or lower) and, thus, no pointer is illustrated coming from these associated blocks in FIG. 7. The entries "appldata(4)" through "appldata(7)" all point to the classification hash length record 720 while the remainder of the "appldata(n)" entries point to the record 725.

EXAMPLE 1

A Web Request with URI="/usr/lpp/tcpip"

For this example, the URI length is 14 and appldata(14) points to the hash length record 725 which has a classification hash length of 8. Thus, the first 8 bytes of data from the URI ("/usr/lpp") are hashed to generate a hash index. Assuming the hash returns an index of 1, hashtab(1) points to policy rule entry 705. However, the "keylen" of 4 found in policy rule entry 704 does not equal the length (8) used for generating the hash index. Accordingly, operations move to policy rule entry 715 which is identified in the "collision chain" field of policy rule entry 705. The "keylen" entry for the policy Rule entry 715 of 8 does match the length used for generating the hash index. Furthermore, the application-data identified in the "key" field of the policy rule entry 715 ("/usr/lpp") matches the associated length segment of the URI of the received Web request. Thus, the "Policy Rule" field in the policy rule entry 715 is used.

Figure 6:
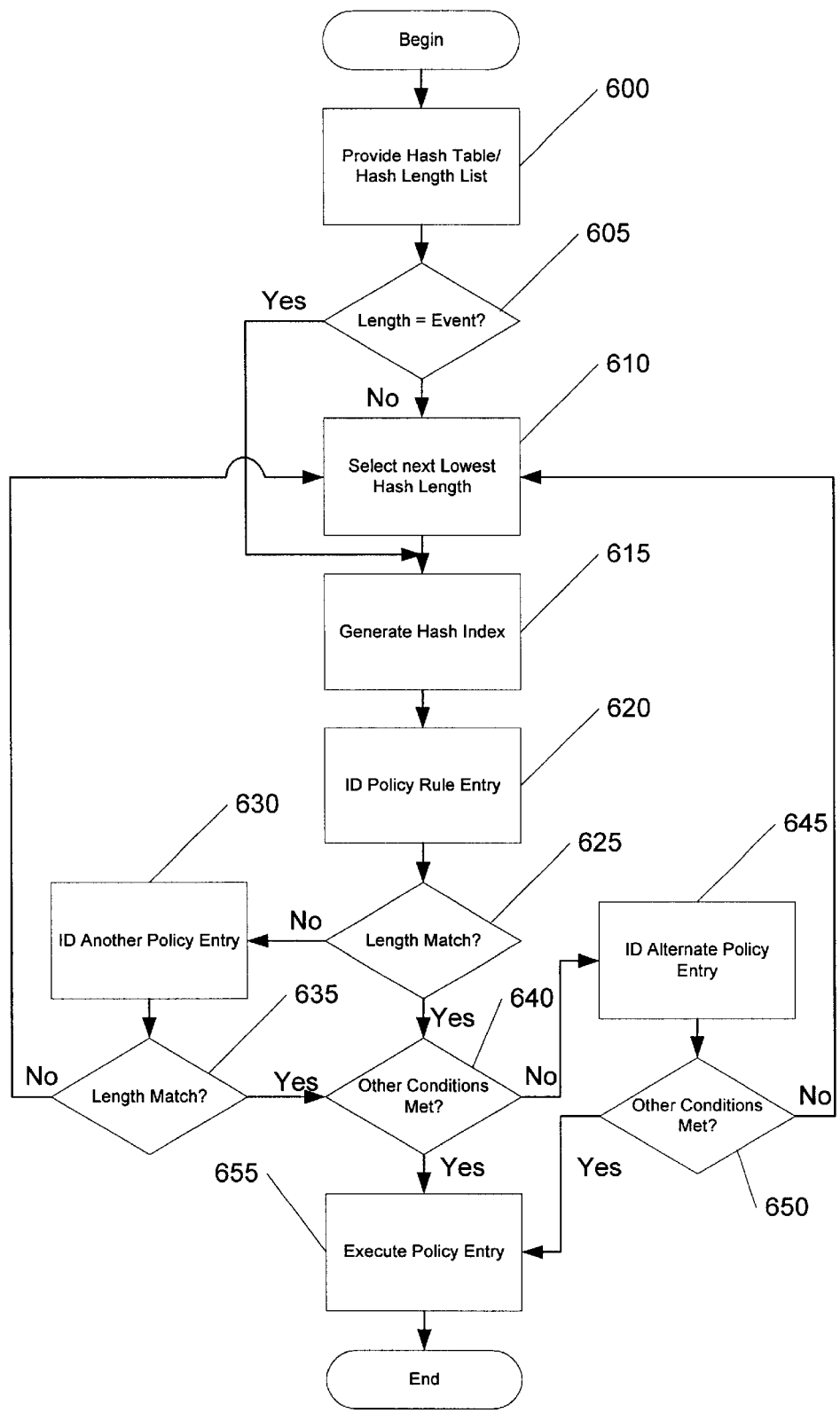
FIG. 6 is a flowchart illustrating operations according to embodiments of the present invention.

However, as described, for example, with reference to the embodiments illustrated in FIG. 6, the policy rule entry 715 may have other associated conditions included in the "Policy Rule" field which additional policy conditions (such as, host addresses, routing conditions, etc.) are evaluated to determine if they are TRUE in addition to confirming the match on the application-data (i.e., classification). If all conditions are TRUE, the actions specified by the "Policy Rule" of the policy rule entry 715 are executed.

If, however, the overall conditions are not satisfied (i.e., evaluate to FALSE), then the collision chain field of the policy rule entry 715 is checked for additional policy rules to be processed. For the example shown in FIG. 7, the "collision chain" field of policy rule entry 715 is null. Therefore, operations move back to selection of a next shorter index for generating a new hash index. As shown in FIG. 7, a "shorter" field is provided in the record 725 which refers back to the record 720 and its associated length of 4. Thus, the first four bytes of the URI data ("/usr") are hashed.

Assuming the hash algorithm returns an index of one, "hashtab(1)" in the index table 730 points to the policy rule entry 705. Both the "keylen" and "key" fields in the policy rule entry 705 match. Any other conditions associated with the policy rule entry 705 are then checked.

Operations as described continue until a matched policy rule entry is identified having all conditions satisfied or until it is determined that no more policy rules with shorter application-data are available to be processed. Note that, while such an extensive search through candidate rules using collision chains and successively lower classification hash lengths may be beneficial in various application environments, the present invention is not so limited and these details are provided by way of understanding of different aspects contained in various embodiments of the present invention.

EXAMPLE 2
A Web Request with URI="/usr/lp"

For this example, the URI length is 7 and appldata(7) in the index table 730 points to the hash length record 720. The hash length record 720 has an associated classification hash length of 4, thus specifying generation of a hash index using the first 4 bytes of data ("/usr"). Assuming the hash algorithm returns an index of 1, hashtab(1) points to the policy rules entry 705. Again, the policy rule entry 705 has both a "keylen" and "key" which match the URI and processing continues as described above with reference to example 1.

EXAMPLE 3
A Web Request with URI="/us"

For this example, the URI length is 3. However, appldata (3) in the index table 730 is null. Therefore, there is no policy rule matching this data.

EXAMPLE 4
A Web Request with URI="/bin/test"

For this example, the URI length is 9 and appldata(9) in the index table 730 points to the policy rule entry 725 which indicates a classification hash length of 8 (thereby triggering hashing of the first 8 bytes of data ("/bin/test") to generate a hash index). Assuming the hash algorithm returns an index of 2, hashtab(2) in the index table 730 is null indicating there is no policy rule with a matching application-data to be tested and processed.

The "shorter" field of the classification hash length record 725 may then be used to move down to the next lower length, thus pointing to classification hash length record 720 which has an associated classification hash length of 4. Therefore, hashing is performed using the first 4 bytes of data ("/bin"). Assuming the hash algorithm returns an index of 10, hashtab(10) points to the policy rule entry 710 which, in turn, has a "keylen" and "key" field which match the URI data. Other policy conditions, if any, associated with the policy rule entry 710 may then be evaluated to confirm that the "Policy Rule" should be applied. Operations proceed further as necessary as described with reference to Example 1 above.

The flowcharts and block diagrams of FIGS. 1 through 6 illustrate the architecture, functionality, and operation of possible implementations of systems, methods and computer program products for processing an event using a classification based hash index according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposed of limitation, the scope of the invention being set forth in the following claims.

That which is claimed:

1. A method for processing an event having a classification based on associated policy rules, the policy rules being conditioned on the classification, the method comprising the steps of:

providing a policy rules hash table including a plurality of policy rule entries, each policy rule entry being associated with a hash index;

receiving the event;

generating a hash index using a classification hash length based on the classification of the event, the classification having an associated length at least equal to the classification hash length;

identifying a policy rule entry in the policy rules hash table that corresponds to the generated hash index;

determining if a classification field length associated with the identified policy rule corresponds to the classification hash length; and executing the identified policy rule entry if the hash length associated with the identified policy rule corresponds to the classification hash length.

2. The method of claim 1 wherein the step of generating a hash index comprises the steps of:

providing a list identifying classification hash lengths to be used for generation of a hash index for a plurality of candidate classification lengths of the classification, the list having associated classification hash lengths corresponding to classification field lengths associated with at least one of the plurality of policy rule entries;

identifying from the provided list a classification hash length for the received event which is no greater than the associated length of the classification; and generating the hash index using the identified classification hash length.

3. The method of claim 2 wherein the step of identifying from the provided list a classification hash length further comprises the steps of:

identifying from the provided list a classification hash length for the received event which is equal to the associated length of the classification of the received event if such a classification hash length is found in the provided list; and selecting as the identified hash length a classification hash length which is found in the provided list as a classification hash length for the received event, the selected classification hash length being a largest length not greater than the associated length of the classification of the received event, if a classification hash length which is equal to the associated length of the classification of the received event is not found in the provided list.

4. The method of claim 1 wherein the identified policy rule entry has a plurality of associated conditions, the classification being one of the plurality of associated conditions, the method further comprising the step of determining if all of the plurality of associated conditions are met and wherein the step of executing the identified policy rule entry further comprises the step of executing the identified policy rule entry only if all of the plurality of associated conditions are met.

5. A method for processing an event having a classification based on associated policy rules, the policy rules being conditioned on the classification, the method comprising the steps of:

providing a policy rules hash table including a plurality of policy rule entries, each policy rule entry being associated with a hash index;

receiving the event;

providing a list identifying classification hash lengths to be used for generation of a hash index for a plurality of candidate classification lengths of the classification, the list having associated classification hash lengths corresponding to classification field lengths found in at least one of the plurality of policy rule entries;

identifying from the provided list a classification hash length for the received event which is no greater than an associated length of the classification of the received event;

generating a hash index using the identified classification hash length;

identifying a policy rule entry in the policy rules hash table that corresponds to the generated hash index and that has an associated classification field length that corresponds to the classification hash length of the event;

determining if all conditions associated with the identified policy rule entry are met; and executing the identified policy rule entry if all conditions associated with the identified policy rule entry are met.

6. The method of claim 5 wherein the step of identifying from the provided list a classification hash length further comprises the steps of:

identifying from the provided list a classification hash length for the received event which is equal to the associated length of the classification of the received event if such a classification hash length is found in the provided list; and selecting as the identified hash length a classification hash length which is found in the provided list as a classification hash length for the received event, the selected classification hash length being a largest length not greater than the associated length of the classification of the received event, if a classification hash length which is equal to the associated length of the classification of the received event is not found in the provided list.

7. The method of claim 6 further comprising the steps of:

determining if another policy rule entry in the policy rules hash table corresponds to the generated hash index and has an associated classification field length that corresponds to the classification hash length of the event if a first policy rule entry in the policy rules hash table is identified that corresponds to the generated hash index and has an associated classification field length that does not correspond to the classification hash length of the event;

determining if all conditions associated with the another policy rule entry are met; and executing the another policy rule entry if all conditions associated with the another policy rule entry are met.

8. The method of claim 7 further comprising the steps of:

determining if the identified policy rule entry includes a reference to an alternate policy rule entry in the policy rules hash table if all conditions associated with the identified policy rule entry are not met;

determining if all conditions associated with the alternate policy rule entry are met; and executing the alternate policy rule entry if all conditions associated with the alternate policy rule entry are met.

9. The method of claim 8 further comprising the steps of:

selecting as the identified hash length a next lowest classification hash length which is found in the provided list as an alternate classification hash length for the received event, the selected next lowest classification hash length being a largest length not greater than the selected classification hash length, if all conditions associated with the identified policy rule entry are not met and if the identified policy rule entry does not include a reference to an alternate policy rule entry; and generating the hash index using the next lowest classification entry.

10. A method for processing a Web request having an associated classification at a communication server based on associated policy rules, the policy rules being conditioned on the classification, the method comprising the steps of:

providing a policy rules hash table including a plurality of policy rule entries, each policy rule entry being associated with a hash index;

receiving the Web request at the communication server;

providing a list identifying classification hash lengths to be used for generation of a hash index for a plurality of candidate classification lengths of the classification, the list having associated classification hash lengths corresponding to classification field lengths found in at least one of the plurality of policy rule entries;

identifying from the provided list a classification hash length for the received Web request which is no greater than an associated length of the classification of the received Web request;

generating a hash index using the identified classification hash length;

identifying a policy rule entry in the policy rules hash table that corresponds to the generated hash index and that has an associated classification field length that corresponds to the classification hash length of the Web request;

determining if all conditions associated with the identified policy rule entry are met; and executing the identified policy rule entry to process the Web request if all conditions associated with the identified policy rule entry are met.

11. The method of claim 10 wherein the associated classification is a Universal Resource Indicator (URI) associated with the Web request.

12. A system for processing an event having a classification based on associated policy rules, the policy rules being conditioned on the classification, the system comprising:

a policy rules hash table including a plurality of policy rule entries, each policy rule entry being associated with a hash index;

means for receiving the event;

means for generating a hash index using a classification hash length based on the classification of the event, the classification having an associated length at least equal to the classification hash length;

means for identifying a policy rule entry in the policy rules hash table that corresponds to the generated hash index;

means for determining if a classification field length associated with the identified policy rule corresponds to the classification hash length; and means for executing the identified policy rule entry if the hash length associated with the identified policy rule corresponds to the classification hash length.

13. The system of claim 12 wherein the means for generating a hash index further comprises:

a list identifying classification hash lengths to be used for generation of a hash index for a plurality of candidate classification lengths of the classification, the list having associated classification hash lengths corresponding to classification field lengths associated with at least one of the plurality of policy rule entries;

means for identifying from the provided list a classification hash length for the received event which is no greater than the associated length of the classification; and means for generating the hash index using the identified classification hash length.

14. The system of claim 13 wherein the means for identifying from the provided list a classification hash length further comprises:

means for identifying from the provided list a classification hash length for the received event which is equal to the associated length of the classification of the received event if such a classification hash length is found in the provided list; and means for selecting as the identified hash length a classification hash length which is found in the provided list as a classification hash length for the received event, the selected classification hash length being a largest length not greater than the associated length of the classification of the received event, if a classification hash length which is equal to the associated length of the classification of the received event is not found in the provided list.

15. The system of claim 12 wherein the identified policy rule entry has a plurality of associated conditions, the classification being one of the plurality of associated conditions, the system further comprising:

means for determining if all of the plurality of associated conditions are met; and wherein the means for executing the identified policy rule entry further comprises means for executing the identified policy rule entry only if all of the plurality of associated conditions are met.

16. A system for processing an event having a classification based on associated policy rules, the policy rules being conditioned on the classification, the system comprising:

a policy rules hash table including a plurality of policy rule entries, each policy rule entry being associated with a hash index;

a list identifying classification hash lengths to be used for generation of a hash index for a plurality of candidate classification lengths of the classification, the list having associated classification hash lengths corresponding to classification field lengths found in at least one of the plurality of policy rule entries;

means for identifying from the provided list a classification hash length for the event which is no greater than an associated length of the classification of the event;

means for generating a hash index using the identified classification hash length;

means for identifying a policy rule entry in the policy rules hash table that corresponds to the generated hash index and that has an associated classification field length that corresponds to the classification hash length of the event;

means for determining if all conditions associated with the identified policy rule entry are met; and means for executing the identified policy rule entry if all conditions associated with the identified policy rule entry are met.

17. The system of claim 16 wherein the means for identifying from the provided list a classification hash length further comprises:

means for identifying from the provided list a classification hash length for the event which is equal to the associated length of the classification of the event if such a classification hash length is found in the provided list; and means for selecting as the identified hash length a classification hash length which is found in the provided list as a classification hash length for the received event, the selected classification hash length being a largest length not greater than the associated length of the classification of the event, if a classification hash length which is equal to the associated length of the classification of the event is not found in the provided list.

18. The system of claim 17 further comprising:

means for determining if another policy rule entry in the policy rules hash table corresponds to the generated hash index and has an associated classification field length that corresponds to the classification hash length of the event if a first policy rule entry in the policy rules hash table is identified that corresponds to the generated hash index and has an associated classification field length that does not correspond to the classification hash length of the event;

means for determining if all conditions associated with the another policy rule entry are met; and means for executing the another policy rule entry if all conditions associated with the another policy rule entry are met.

19. The system of claim 18 further comprising:

means for determining if the identified policy rule entry includes a reference to an alternate policy rule entry in the policy rules hash table if all conditions associated with the identified policy rule entry are not met;

means for determining if all conditions associated with the alternate policy rule entry are met; and means for executing the alternate policy rule entry if all conditions associated with the alternate policy rule entry are met.

20. The system of claim 19 further comprising:

means for selecting as the identified hash length a next lowest classification hash length which is found in the provided list as an alternate classification hash length for the event, the selected next lowest classification hash length being a largest length not greater than the selected classification hash length, if all conditions associated with the identified policy rule entry are not met and if the identified policy rule entry does not include a reference to an alternate policy rule entry; and means for generating the hash index using the next lowest classification entry.

21. A system for processing a Web request having an associated classification at a communication server based on associated policy rules, the policy rules being conditioned on the classification, the system comprising:

a policy rules hash table including a plurality of policy rule entries, each policy rule entry being associated with a hash index;

means for receiving the Web request at the communication server;

a list identifying classification hash lengths to be used for generation of a hash index for a plurality of candidate classification lengths of the classification, the list having associated classification hash lengths corresponding to classification field lengths found in at least one of the plurality of policy rule entries;

means for identifying from the provided list a classification hash length for the received Web request which is no greater than an associated length of the classification of the received Web request;

means for generating a hash index using the identified classification hash length;

means for identifying a policy rule entry in the policy rules hash table that corresponds to the generated hash index and that has an associated classification field length that corresponds to the classification hash length of the Web request;

means for determining if all conditions associated with the identified policy rule entry are met; and means for executing the identified policy rule entry to process the Web request if all conditions associated with the identified policy rule entry are met.

22. The system of claim 21 wherein the associated classification is a Universal Resource Indicator (URI) associated with the Web request.

23. A system for processing an event having a classification based on associated policy rules, the policy rules being conditioned on the classification, the system comprising:

a policy rules hash table including a plurality of policy rule entries, each policy rule entry being associated with a hash index;

a hash index generator circuit that generates a hash index using a classification hash length based on the classification of the event, the classification having an associated length at least equal to the classification hash length;

a hash lookup circuit that identifies a policy rule entry in the policy rules hash table that corresponds to the generated hash index; and a comparison circuit that determines if a classification field length associated with the identified policy rule corresponds to the classification hash length and executes the identified policy rule entry if the hash length associated with the identified policy rule corresponds to the classification hash length.

24. The system of claim 23 wherein the system is provided on a communication server of a computer network and wherein the event is a Web request received at the communication server.

25. The system of claim 24 wherein the associated classification is a Universal Resource Indicator (URI) associated with the Web request.

26. A computer program product for processing an event having a classification based on associated policy rules, the policy rules being conditioned on the classification, comprising:

a computer-readable storage medium having computer-readable program code embodied in said medium, said computer-readable program code comprising:

computer-readable program code which generates a hash index using a classification hash length based on the classification of the event, the classification having an associated length at least equal to the classification hash length;

computer-readable program code which identifies a policy rule entry that corresponds to the generated hash index in a policy rules hash table including a plurality of policy rule entries, each policy rule entry being associated with a hash index;

computer-readable program code which determines if a classification field length associated with the identified policy rule corresponds to the classification hash length; and computer-readable program code which executes the identified policy rule entry if the hash length associated with the identified policy rule corresponds to the classification hash length.

27. The computer program product of claim 26 wherein the computer-readable program code which generates a hash index further comprises:

computer-readable program code which identifies a classification hash length for the event which is no greater than the associated length of the classification from a list identifying classification hash lengths to be used for generation of a hash index for a plurality of candidate classification lengths of the classification, the list having associated classification hash lengths corresponding to classification field lengths associated with at least one of the plurality of policy rule entries; and computer-readable program code which generates the hash index using the identified classification hash length.

28. The computer program product of claim 27 wherein the computer-readable program code which identifies from the provided list a classification hash length further comprises:

computer-readable program code which identifies from the provided list a classification hash length for the received event which is equal to the associated length of the classification of the received event if such a classification hash length is found in the provided list; and computer-readable program code which selects as the identified hash length a classification hash length which is found in the provided list as a classification hash length for the received event, the selected classification hash length being a largest length not greater than the associated length of the classification of the received event, if a classification hash length which is equal to the associated length of the classification of the received event is not found in the provided list.

29. The computer program product of claim 26 wherein the identified policy rule entry has a plurality of associated conditions, the classification being one of the plurality of associated conditions, the computer program product further comprising:

computer-readable program code which determines if all of the plurality of associated conditions are met; and wherein the computer-readable program code which executes the identified policy rule entry further comprises computer-readable program which code executes the identified policy rule entry only if all of the plurality of associated conditions are met.

30. A computer program product for processing an event having a classification based on associated policy rules, the policy rules being conditioned on the classification, comprising:

a computer-readable storage medium having computer-readable program code embodied in said medium, said computer-readable program code comprising:

computer-readable program code which identifies from a list identifying classification hash lengths to be used for generation of a hash index for a plurality of candidate classification lengths of the classification, the list having associated classification hash lengths corresponding to classification field lengths found in at least one of the plurality of policy rule entries, the plurality of policy rule entries being included in a policy rules hash table, each policy rule entry being associated with a hash index, a classification hash length for the event which is no greater than an associated length of the classification of the event;

computer-readable program code which generates a hash index using the identified classification hash length;

computer-readable program code which identifies a policy rule entry in the policy rules hash table that corresponds to the generated hash index and that has an associated classification field length that corresponds to the classification hash length of the event;

computer-readable program code which determines if all conditions associated with the identified policy rule entry are met; and computer-readable program code which executes the identified policy rule entry if all conditions associated with the identified policy rule entry are met.

31. The computer program product of claim 30 wherein the computer-readable program code which identifies from the provided list a classification hash length further comprises:

computer-readable program code which identifies from the provided list a classification hash length for the event which is equal to the associated length of the classification of the event if such a classification hash length is found in the provided list; and computer-readable program code which selects as the identified hash length a classification hash length which is found in the provided list as a classification hash length for the received event, the selected classification hash length being a largest length not greater than the associated length of the classification of the event, if a classification hash length which is equal to the associated length of the classification of the event is not found in the provided list.

32. The computer program product of claim 31 further comprising:

computer-readable program code which determines if another policy rule entry in the policy rules hash table corresponds to the generated hash index and has an associated classification field length that corresponds to the classification hash length of the event if a first policy rule entry in the policy rules hash table is identified that corresponds to the generated hash index and has an associated classification field length that does not correspond to the classification hash length of the event;

computer-readable program code which determines if all conditions associated with the another policy rule entry are met; and computer-readable program code which executes the another policy rule entry if all conditions associated with the another policy rule entry are met.

33. The computer program product of claim 32 further comprising:

computer-readable program code which determines if the identified policy rule entry includes a reference to an alternate policy rule entry in the policy rules hash table if all conditions associated with the identified policy rule entry are not met;

computer-readable program code which determines if all conditions associated with the alternate policy rule entry are met; and computer-readable program code which executes the alternate policy rule entry if all conditions associated with the alternate policy rule entry are met.

34. The computer program product of claim 33 further comprising:

computer-readable program code which selects as the identified hash length a next lowest classification hash length which is found in the provided list as an alternate classification hash length for the event, the selected next lowest classification hash length being a largest length not greater than the selected classification hash length, if all conditions associated with the identified policy rule entry are not met and if the identified policy rule entry does not include a reference to an alternate policy rule entry; and computer-readable program code which generates the hash index using the next lowest classification entry.

35. A computer program product for processing a Web request having an associated classification at a communication server based on associated policy rules, the policy rules being conditioned on the classification, comprising:

a computer-readable storage medium having computer-readable program code embodied in said medium, said computer-readable program code comprising:

computer-readable program code which identifies from a list identifying classification hash lengths to be used for generation of a hash index for a plurality of candidate classification lengths of the classification, the list having associated classification hash lengths corresponding to classification field lengths found in at least one of a plurality of policy rule entries included in a policy rules hash table, each policy rule entry being associated with a hash index, a classification hash length for the received Web request which is no greater than an associated length of the classification of a received Web request;

computer-readable program code which generates a hash index using the identified classification hash length;

computer-readable program code which identifies a policy rule entry in the policy rules hash table that corresponds to the generated hash index and that has an associated classification field length that corresponds to the classification hash length of the Web request;

computer-readable program code which determines if all conditions associated with the identified policy rule entry are met; and computer-readable program code which executes the identified policy rule entry to process the Web request if all conditions associated with the identified policy rule entry are met.

36. The computer program product of claim 35 wherein the associated classification is a Universal Resource Indicator (URI) associated with the Web request.

* * * * *